United States Patent
Weber

[15] 3,666,238
[45] May 30, 1972

[54] TOOL

[72] Inventor: Henri Weber, 57-18 162 Street, Flushing, N.Y. 11365

[22] Filed: July 30, 1970

[21] Appl. No.: 59,482

[52] U.S. Cl. .......................................................... 254/131.5
[51] Int. Cl. ........................................................... B66f 3/00
[58] Field of Search .................. 254/131, 131.5; 29/267, 278

[56] References Cited

UNITED STATES PATENTS 2,894,720  7/1959  Bennett.............................254/131 X

*Primary Examiner*—Andrew R. Juhasz
*Assistant Examiner*—David R. Melton
*Attorney*—Joseph B. Forman

[57] ABSTRACT

This invention relates to an improved tool such as may be used to pry windshield wiper arms from their supports. The fulcrum point is resilient to avoid damage to paint or glass on a vehicle.

4 Claims, 4 Drawing Figures

PATENTED MAY 30 1972 3,666,238

INVENTOR.
HENRI WEBER
BY Joseph B Forman
ATTORNEY

TOOL

This invention relates to improvements in a tool, and more particularly to a tool such as is useful for separating a windshield wiper arm assembly from a driving shaft.

It is the present practice of the automobile manufacturers to secure the windshield wiper arm assembly to a driving member by slipping one longitudinal extremity of the windshield wiper arm assembly over a driving member extending outward from the car body and providing a tight fit between the two. The driving member and the wiper arm assembly are provided with interlocking ridges to prevent rotatable slippage when the two are inter-engaged.

It occassionally becomes necessary to remove the wiper arm assembly from the driving member and it is the present custom, as observed by applicant, to pry the assembly from the driving member through use of a screwdriver, plier or other available lever. The use of such devices however poses problems in that the automotive paint and at times the windshield are susceptible to damage due to slippage of the tool used.

It is a prime object of the invention to provide an improved tool for the removal of a windshield wiper arm assembly from a driven shaft.

It is further object of the invention to provide a tool which will facilitate the replacement of the same or a new windshield wiper arm assembly.

Other objects and advantages of the present invention will be obvious to those reading the following description when reference is had to the annexed drawing wherein.

Figure 1:
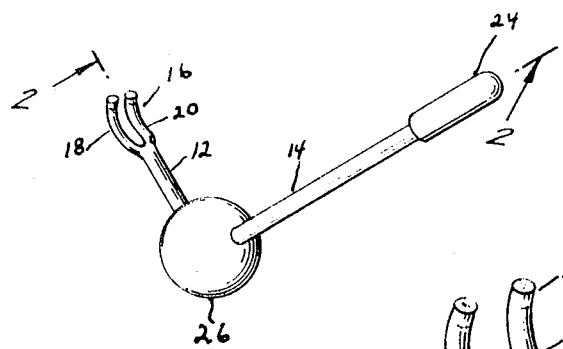
FIG. 1 is a side view, partially in section, of the tool embodying my invention.
Figure 3:
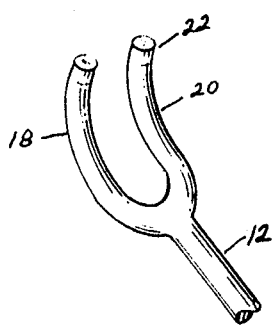
FIG. 3 is a plan view of an alternate type of head piece which may be utilized with the tool of FIG. 1.

Referring to the drawing in detail and more particularly FIG. 1, the tool body member 10 comprises a first arm member 12 and a second arm member 14 which are deformed from a single sheet of stock or joined from two pieces of stock to form the apex of an obtuse angle, an angle which is not critical, but may be used to best advantage between approximately 90° and 145°. The ratio of the lengths of arm 10 to 12 should be less than 1 and may for purposes of illustration be one-half or one-third or even less.

Figure 2:
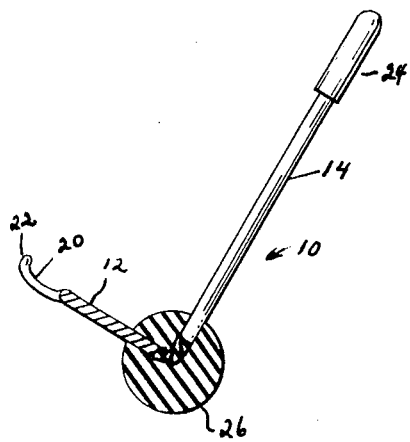
FIG. 2 is a plan view of one type of head piece which may be utilized with the tool of FIG. 1.
Figure 4:
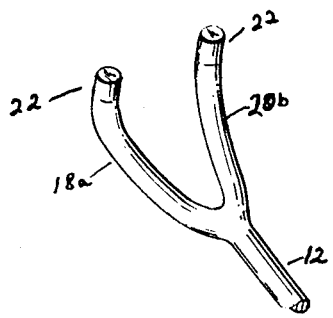
FIG. 4 is a side view of a head piece such as is shown in FIGS. 2 and 3.

Arm 12 is formed at its free end with a substantially "U" shaped head member 16 having two substantially parallel legs 18 and 20 as shown in FIG. 2. The ends of legs 18 and 20 are formed with an elevated edge 22 which may be in a form such as is shown in FIGS. 1 and 4 and is provided for a purpose as will hereinafter be shown.

In an alternate construction the head of the free end of arm 10 may be formed with a substantially "V" shaped member 16 having two legs 18a and 20a with their proximate edges sloped toward one another from their free ends to form the apex of the "V."

Arm 14 is formed with a hand grip or handle 24 at its free end. At the apex formed by the common junction of arms 12 and 14 a resilient member 26, formed of a hard rubber or any suitable known plastic capable of withstanding repeated impact, is secured to the apex to form a fulcrum point and hammer head for the tool. Although this resilient member 26 is shown as a ball it may take the shape of a hammer head if desired.

In operation the extreme free end of arm 12 is slipped under the secured end of a mounted windshield wiper arm assembly, the resilient member 26 is allowed to fall on the body of the vehicle and an operator moves the grip 24 toward the car body. As is now obvious, the elevated edge discourages the slippage of the end member from under the end of the windshield wiper arm assembly. In some cases it may first be necessary to release an auxilliary latch but the foregoing action by the operator in utilizing the tool will allow the windshield wiper arm assembly to be disengaged from the driving member.

In remounting a windshield wiper arm assembly to the driving member, the assembly is positioned with respect to the driving member and is driven thereon by impact pressure supplied through resilient member 26 in known fashion.

Having thus disclosed my invention, I desire it understood that variations from the particular embodiment disclosed will become obvious to those skilled in the art and I therefor request that the annexed claims be interpreted within the spirit and scope of the invention.

I claim:

1. A tool comprising a body member having a first arm member and a second arm member, said first and second arm members forming an apex of an obtuse angle, a headpiece at the free extremity of said first arm member, said headpiece having raised edges at its remotest extremities and being adapted to engage the end of a windshield wiper arm assembly mounted on a driver shaft therefor, a handle secured to the free extremity of said second arm member.

2. A tool as defined in claim 1 wherein said headpiece is substantially "U" shaped.

3. A tool as defined in claim 1 wherein said headpiece is substantially "V" shaped.

4. A tool as defined in claim 1 wherein the outer apex of the body member formed by said first and second member is encased in a resilient member.

* * * * *